(No Model.) 2 Sheets—Sheet 2.
M. J. TODD.
SPRING TOOTH HARROW.
No. 516,951. Patented Mar. 20, 1894.
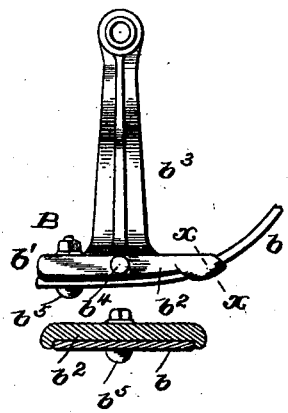
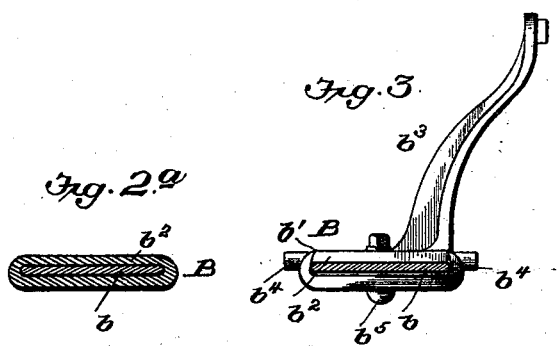
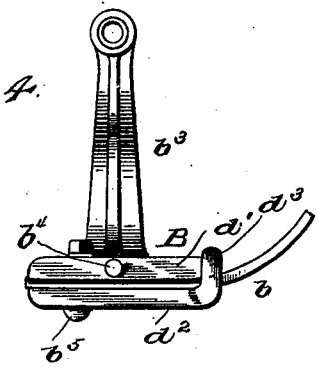
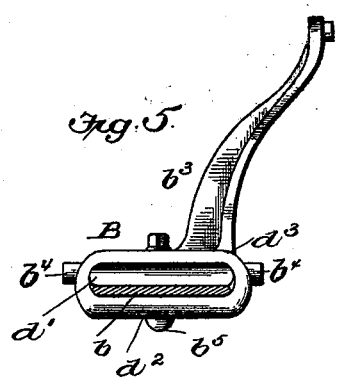
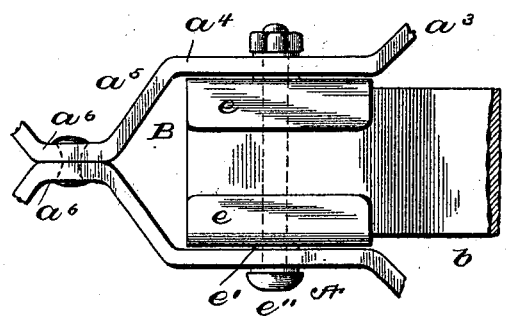
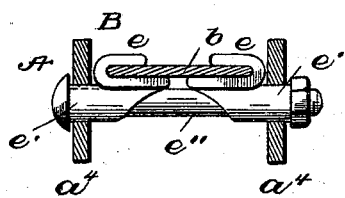
Witnesses
John Irvine
Wm. S. Hodges
Inventor
Marquis J. Todd,
By J. ... Attorney

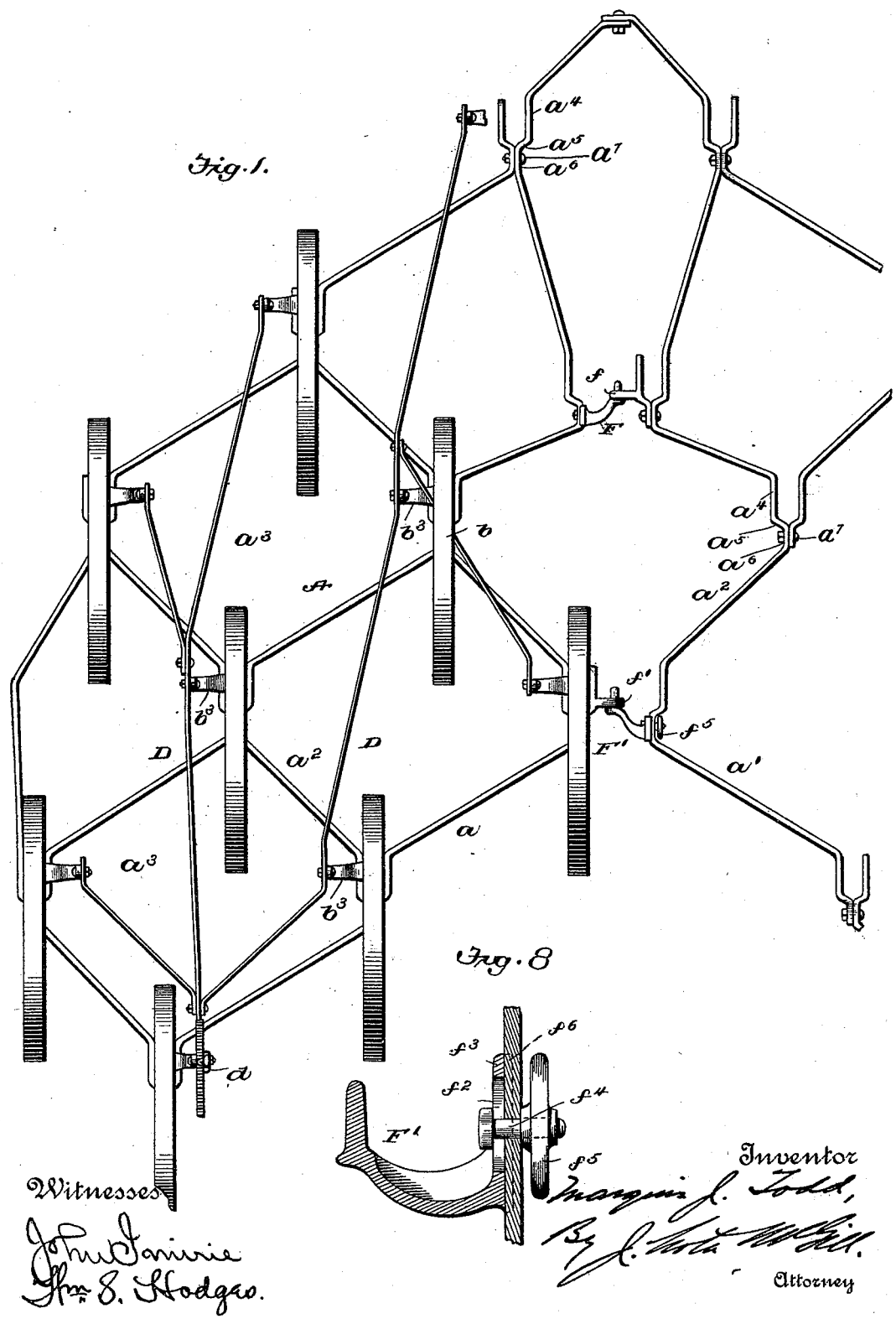

UNITED STATES PATENT OFFICE.

MARQUIS J. TODD, OF BUFFALO, NEW YORK.

SPRING-TOOTH HARROW.

SPECIFICATION forming part of Letters Patent No. 516,951, dated March 20, 1894.

Application filed May 12, 1893. Serial No. 474,008. (No model.)

*To all whom it may concern:*

Be it known that I, MARQUIS J. TODD, of Buffalo, in the county of Erie and State of New York, have invented certain new and useful Improvements in Spring-Tooth Harrows; and I do hereby declare the following to be a full, clear, and exact description of the invention, such as will enable others skilled in the art to which it appertains to make and use the same.

This invention relates to spring tooth harrows, and it has for its object, first, the production of a new form of frame to which the harrow teeth are secured, the integrity of which frame is not affected by the tooth clips or holders; second, to provide a simple and inexpensive form of clip for said teeth, and third, a secure and easily adjusted fastening device between the frame sections.

To these ends, the invention comprises a harrow frame composed of zig-zag bars forming diamond-shape openings and having disconnected parallel portions between which the harrow teeth are mounted, said bars being firmly united together at adjacent meeting points beyond said parallel portions, whereby the teeth and their holders can be easily adjusted and the integrity of the frame preserved.

The invention further comprises a frame having zig-zag bars provided with disconnected parallel portions and adjacent meeting portions rigidly held together, and a series of harrow teeth having pivot-bearings mounted between said disconnected parallel portions and having means for effecting the simultaneous adjustment of all the teeth.

The invention further comprises a frame of the character above specified and a tooth clip having lateral lugs or hubs fitting in openings in the disconnected parallel portions and means for effecting the simultaneous adjustment of all the teeth.

The invention further comprises a frame of the character above specified and a tooth clip having lateral lugs or hubs fitting in openings in the disconnected parallel portions of the frame and means for binding the harrow teeth.

The invention further comprises a harrow formed in two sections, from each of which projects a hook engaging an opposite eye of the other section, one of said hooks being adjustably held in position.

The invention also comprises the details of construction, combination and arrangement of parts, substantially as hereinafter fully set forth and particularly pointed out in the claims.

In the accompanying drawings:—Figure 1 is a plan view of my improved harrow with a portion of one frame section broken away and with some of the teeth omitted. Figs. 2 and 3 are, respectively, side and end views of the preferred form of tooth clip or holder. Fig. $2^a$ is a cross-sectional view on the line $x$—$x$, Fig. 2. Figs. 4 and 5 are, respectively, side and end views of a slightly modified form of clip. Figs. 6 and 7 are similar views of another modification. Fig. 8 is a detail view showing the connection between the frame sections.

Referring to the drawings, A designates the harrow-frame formed in two sections $a$, $a'$, and composed of zig-zag bars $a^2$. These bars are bent to form approximately diamond-shape openings $a^3$, disconnected parallel portions $a^4$, V-shape portions $a^5$, and parallel meeting portions $a^6$, the latter being rigidly and securely held together by nutted bolts $a^7$. Between the parallel portions $a^4$ the spring teeth are designed to be secured in such manner that the rigidity of the frame is not affected by the adjustment of said teeth, and at the same time the advantages attained by the diamond-shaped openings are preserved.

B is the tooth clip, and $b$ the tooth held thereby. The preferred form of clip is shown in Figs. 2 and 3 and consists of a slightly curved plate $b'$ having a forward lower loop $b^2$, an upwardly extended arm or projection $b^3$ and lateral lugs or hubs $b^4$ designed to fit loose in corresponding holes in the disconnected parallel portions $a^4$. A nutted bolt $b^5$ holds the tooth $b$ to the rear end of plate $b'$ and between the depending flanges of said plate, said bolt being passed up through a slot in said tooth coincident with a hole in said plate. To the outer ends of arms $b^3$ are connected series of straps D under the control of a lever $d$ for effecting simultaneous adjustment of all the teeth, as fully set forth in my pending application for patent filed March 28, 1893, Serial No. 468,389.

In Figs. 4 and 5 I have shown a slightly modified form of my tooth clip. In this form I employ two plates or sections $d'$, $d^2$, the latter having a forward loop $d^3$ overlapping the end of plate $d'$. The tooth is held between these plates by the nutted bolt $b^5$, and the lugs or hubs $b^4$ extend laterally from the upper plate $d'$.

The form of clip shown in Figs. 6 and 7 comprises two corresponding sections $e$ having inner grooved faces in which fit the longitudinal edges of the harrow teeth, and from said sections extend hollow hubs $e'$ fitting loose in the holes in the parallel portions $a^4$. A nutted bolt $e''$ passed through these hubs will serve to bind or clamp the sections against the tooth. When this form of clip is employed the parallel meeting portions of the zig-zag bars may be rigidly held together by rivets in lieu of bolts, the loosening or disconnection of the bars being unnecessary in order to effect the adjustment of the teeth or removal or positioning of the clips.

The frame sections $a$, $a'$, are held together by hooks F, F' engaging eyes $f$, $f'$. The forward hook F is rigidly attached to one of the bars of section $a$ and engages eye $f$ of section $a'$. The rearward hook F' is adjustably attached to section $a'$ and engages eye $f'$ of section $a$. These eyes are shown as forming part of sectional bars for adjacent teeth, but it is obvious that they may be screwed therein or applied at other suitable points. The hook F' has a slot $f^2$ in its inner widened plate $f^3$ and through it and a hole in the bar of section $a'$ is passed a bolt $f^4$ on the threaded part of which is a small hand-wheel $f^5$. By means of this wheel and bolt the hook F' can be readily adjusted and firmly held at any desired point. The plates $f^3$ have upper and lower flanges $f^6$ between which the bars to which they are attached snugly fit, preventing the turning of the plates and hooks. It will be observed that the outward rounded portions of both hooks extend in the same direction, namely, forward; and hence to connect the sections it is necessary to first loosen the hook F' and slide the latter rearward. After the forward and rearward hooks have been made to engage their respective eyes, said hook F' is moved forward and firmly tightened by turning wheel $f^5$. Thus the sections are bound together and accidental loosening or separation is prevented. The thread on bolt $f^4$ is such that contact of hand-wheel $f^5$ with the ground in the forward travel of the harrow will serve to further tighten said hand wheel.

The principle advantage of my invention lies in the construction of the harrow frame, the integrity of which is insured and the zig-zag bars are rigidly and firmly connected together at meeting points beyond the disconnected parallel portions between which latter the teeth are pivotally mounted.

The form of clip herein-described is extremely simple and inexpensive, and is specially adapted to a form of harrow frame such as herein specified where all strain of the connections between the zig-zag bars is removed from the point of attachment of the teeth.

I claim as my invention—

1. A harrow frame composed of continuous zig-zag bars having disconnected parallel portions, inwardly extended portions and parallel meeting portions, the latter being rigidly secured together, as set forth.

2. The harrow frame composed of zig-zag bars, teeth mounted between parallel portions thereof, said bars being rigidly secured together at points beyond said parallel portions, as set forth.

3. The combination with a harrow frame composed of zig-zag bars having disconnected parallel portions and adjacent meeting portions rigidly held together, of a series of harrow teeth, pivot-bearings therefor loosely mounted between said disconnected parallel portions, and means for adjusting said teeth, substantially as set forth.

4. The harrow frame composed of zig-zag bars forming diamond-shape openings and having disconnected parallel portions and adjacent meeting portions rigidly held together, the teeth, and the clips therefor held between said disconnected parallel portions, as set forth.

5. The harrow frame composed of zig-zag bars forming diamond-shape openings and having disconnected parallel portions and adjacent meeting portions rigidly held together, the teeth, the clips therefor loosely held between said disconnected parallel portions, and means for simultaneously adjusting all of said teeth, substantially as set forth.

6. The combination with the frame having zig-zag bars provided with disconnected parallel portions and adjacent meeting portions held together, of the teeth, and the clips therefor having lateral lugs or hubs fitting loose in openings in said disconnected parallel portions, substantially as set forth.

7. The combination with the frame having zig-zag bars provided with disconnected parallel portions and adjacent meeting portions held together, of the teeth, the clips therefor having forward loops and lateral lugs or hubs, and nutted bolts passed through coincident openings in the teeth and clips, substantially as set forth.

8. The combination with the frame having zig-zag bars provided with disconnected parallel portions and adjacent meeting portions held together, of the teeth, the clips therefor having forward loops and lateral lugs or hubs, nutted bolts passed through coincident openings in the teeth and clips, the arms or projections extending from said clips, and the operating straps connected to said arms or projections, substantially as set forth.

9. A harrow frame formed in sections, and interlocking hooks and eyes extending from said sections, one of said hooks being adjustable, substantially as set forth.

10. A harrow frame formed in sections, and having interlocking hooks and eyes, both of said hooks being extended in the same direction, and means for adjusting and holding one of said hooks, substantially as set forth.

11. A harrow frame formed in sections, the eyes projecting therefrom, the hooks having inner grooved plates, and means for holding said plates to the bars of said sections, one of said plates being capable of adjustment substantially as set forth.

12. The combination with the frame sections, of the eyes projecting therefrom, the hooks for engaging said eyes, one of said hooks being adjustable, and the threaded rods having, one, a nut, and, the other, a hand wheel, substantially as and for the purpose set forth.

13. The combination with the frame sections, composed of bars, and having eyes extending therefrom, of the forward and rearward hooks for engaging said eyes having inner grooved plates, one of said plates being slotted, the threaded rods, and the hand wheel on one of said threaded rods for adjusting and holding one of said hooks, substantially as set forth.

In testimony whereof I have signed this specification in the presence of two subscribing witnesses.

MARQUIS J. TODD.

Witnesses:
J. NOTA McGILL,
WM. S. HODGES.